United States Patent [19]

Hinds et al.

[11] Patent Number: 4,890,023
[45] Date of Patent: Dec. 26, 1989

[54] LINEAR INDUCTION MOTOR SYSTEMS

[76] Inventors: Walter E. Hinds, 1358 Schuyler Rd., Beverly Hills, Calif. 90210; Martyn A. Lewis, 1135 Las Pulgas Pl., Pacific Palisades, Calif. 90272

[21] Appl. No.: 168,640

[22] Filed: Mar. 4, 1988

Related U.S. Application Data

[63] Continuation of Ser. No. 702,899, Feb. 19, 1985, abandoned.

[51] Int. Cl.$^4$ ............................................. H02K 41/00
[52] U.S. Cl. ..................................... 310/12; 318/135
[58] Field of Search ................................... 310/12-14, 310/15, 17, 19; 318/135; 104/290, 292

[56] References Cited

U.S. PATENT DOCUMENTS

| | | | |
|---|---|---|---|
| 2,112,264 | 3/1938 | Bowles et al. | 310/13 X |
| 2,135,373 | 11/1938 | Wilson | 318/135 UX |
| 2,519,253 | 8/1950 | Jones | 318/135 |
| 3,602,786 | 8/1971 | Izhelya et al. | 310/13 X |
| 3,641,939 | 2/1972 | Remy | 310/13 X |
| 3,675,585 | 7/1972 | Wiart et al. | 310/13 X |
| 3,675,757 | 7/1972 | Yabuta | 310/12 X |
| 3,697,838 | 10/1972 | New | 310/13 X |
| 3,736,881 | 6/1973 | Lorinet | 310/13 X |
| 4,463,290 | 7/1984 | Asakawa et al. | 318/135 |
| 4,500,827 | 2/1985 | Merritt | 310/15 |

Primary Examiner—R. Skudy
Attorney, Agent, or Firm—Merchant, Gould, Smith, Edell, Welter & Schmidt

[57] ABSTRACT

A linear induction motor system employs a driven reactive element that is oppositely influenced by a pair of spaced apart devices extending along a predetermined path. By altering the relationship between the reactive elements and devices, the net driving force on the driven element is varied so that a desired velocity profile can be established, and stable index positions can be defined. The principle is advantageously used in controlling a series of independent carts in a material conveyor system, in an arrangement which incorporates secondary positional control device along the cart path, and probe means for inhibiting interference between successive carts.

8 Claims, 4 Drawing Sheets

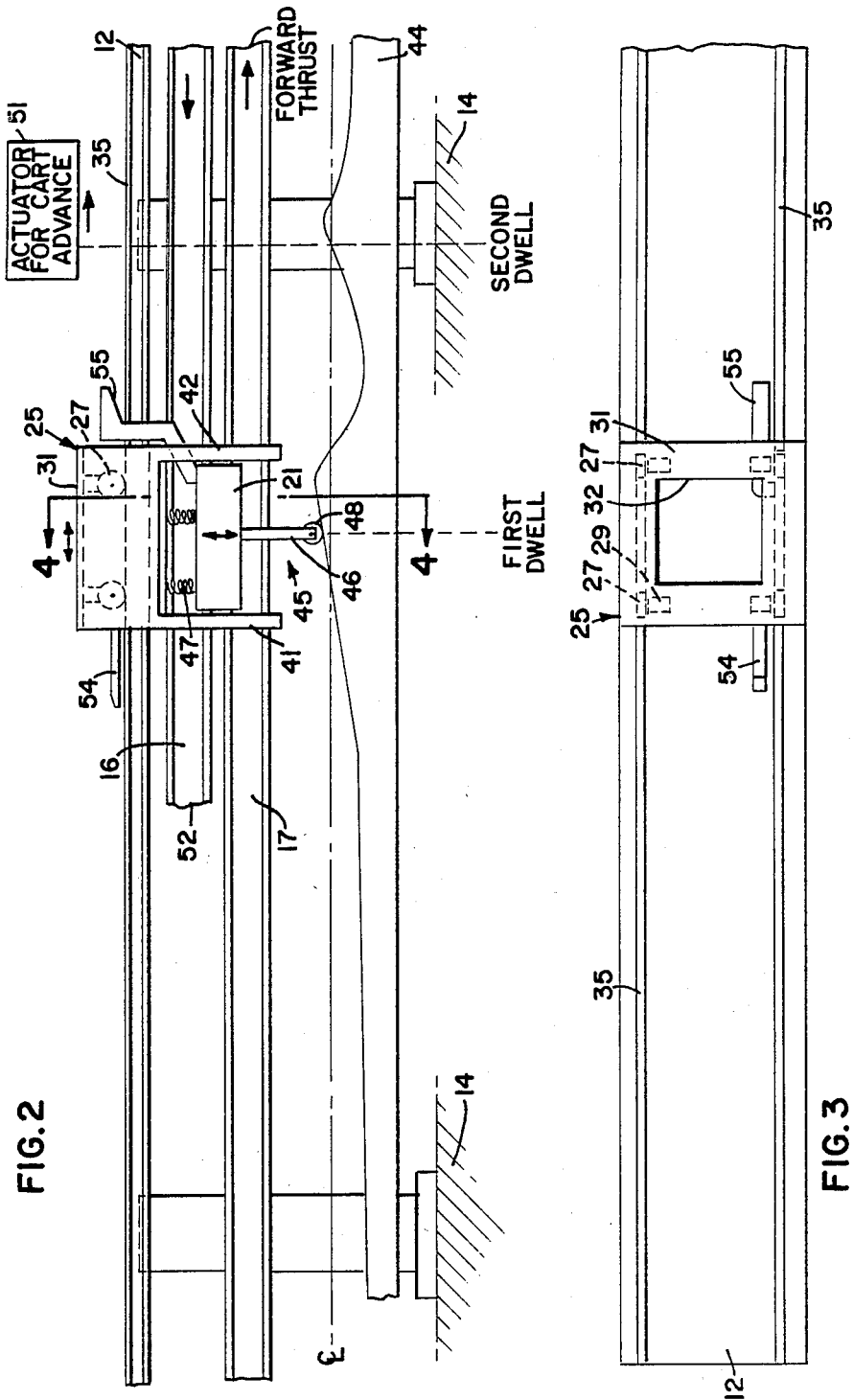

LINEAR INDUCTION MOTOR SYSTEMS

This is a continuation of co-pending application Ser. No. 702,899 filed on Feb. 19, 1985 now abandoned.

BACKGROUND OF THE INVENTION

The linear induction motor (hereafter LIM) as classically practiced generates a linear motion by inductive coupling between a primary or stator which creates a linearly moving magnetic field and a conductive secondary or armature in which thrust is developed by virtue of an induced field causing mutual repulsion between the primary and secondary. The primary is usually but not necessarily the stationary member, and the system can be single sided or double sided, with primaries on opposite sides of the secondary. The linear motor seeks to generate a velocity in the moving element that approaches synchronism with the input wave that actuates the primary. Accelerations and velocities are limited to less than the theoretical maximums by slip, friction, drag and load factors. Velocity and position control schemes for linear motors usually have employed some form of signal control to modulate frequency or power so as to vary thrust in a predetermined way determinative of the desired velocity profile. These control approaches are inherently complex, however, particularly when it is desirable to control a number of different members simultaneously with the same linear propulsion device. In addition, because of their mode of operation it has been difficult to operate linear induction motors at slow speeds and bidirectionally. There are many applications in which the other advantages of LIMs can provide unique benefits if these capabilities can also be supplied. In automated material conveyor systems, for example, a rail or track structure is extended between material pick up stations, delivery and/or work stations. In general, a number of carriers or carts are disposed on the rails of the conveyor system and a drive system extending along the path of the conveyor system serves to move each cart from station to station. In one widely used form of this system, power is transmitted to individual carriers from an elongated rotating member extending along the conveyor path. Each carrier incorporates a controllable power takeoff that is driven frictionally by the rotating member. The angle of the power takeoff determines the velocity of the carrier, and this angle is controlled at each position along the path by an extended cam which roughly parallels the carrier track. This system is not only costly and has inherent frictional wear problems but top speed is limited by the length of the rotating member.

Another proposed system for material conveyors, as in U.S. Pat. No. 3,641,939, describes the use of a LIM having a speed regulating arrangement using a movable secondary on each truck or carrier. The secondary is movable toward and away from a primary so as to alter the inductive coupling between them and thereby assertedly control the velocity. Although various arrangements are shown, including a moving secondary that shifts with the weight of a load and single and double ended versions in which the spacings are varied by a cam surface, no such system has appeared in a commercial version. It is likely that there are several reasons the system was not successful. Varying the gap spacing between primary and secondary requires significant force, and at the same time substantially changes the coupling efficiency in non-linear fashion. Thrust cannot be reversed for individual carriers except by complex controls, and slow speed operation and freedom from creep also cannot be attained. The technology still seeks a system that enables high speed, efficient movement of a carrier between successive work stations with controlled acceleration and deceleration, and stable positioning at index locations.

SUMMARY OF THE INVENTION

Linear induction motor systems in accordance with the invention utilize opposed reactive forces between movable and stationary elements. Sufficient interaction area is provided on a movable member, for example, to span the stationary members with which it reacts, so that thrust can be varied along in controlled fashion along a path and so that stable index positions, at which the movable member is stationary, can be established. In one example of such a linear induction motor, spaced apart, elongated primaries extending along a path are energized with oppositely directed waves, and a secondary having an area sufficient to span both primaries, at least partially, is subjected to a net thrust along the path which is determined by the area of interaction with each of the primaries at any position along the path. In one example, the primaries are substantially parallel and the secondary is shifted laterally to control thrust. In another example, the secondary follows a predetermined path but the two opposing thrust primaries vary in position laterally relative to the path, so as to alter the net thrust exerted as the secondary moves. The two primaries need not be of equal size or exert thrusts of equal amplitude.

Both of these approaches may utilize stationary secondaries and a movable primary, but in such event the primary includes separate coil systems, oppositely energized to generate traveling waves interactive with the stationary sections.

Systems and methods in accordance with the invention further incorporate such linear induction motors to particular advantage in novel conveyor systems for moving carts or carriers containing workpieces between successive work stations. With these arrangements, multiple carriers at separate regions may be driven at high speed concurrently. The carriers are moved along a processing path extending between successive work stations at which different tasks are carried out until processing of the workpiece is complete.

In one conveyor system in accordance with the invention, electrical and oppositely excited primaries extend in parallel along a predetermined path, with a secondary structure on a carrier being disposed at a predetermined spacing from the primaries, but shiftable laterally by a cam system. Thus the coupling ratio between the two different primaries and the secondary is altered by transverse displacement of the secondary under control of a cam that runs parallel to the predetermined path. The thrust exerted on the secondary in conjunction with the various drag and inertial factors, determines the instantaneous velocity of the carrier in the forward direction, and the velocity profile is readily controlled by shaping of the cam. When the carrier is to be decelerated to a stop and held in an index position the secondary is brought to a crossover point at which zero net thrust is exerted, and from which it cannot drift. A task executed on the workpiece at the work station being complete, the cart can be moved electrically or mechanically from the stable position on its path toward the next work station.

In some instances it is desired to have a conveyor system that is bidirectional at least to a limited extent. In accordance with the invention, a workpiece carrier is shuttled back and forth at a work station or between work stations by shifting segments of the system into and out of position. In one specific example, a cam follower controlling a movable reactive element is controlled in one direction by a first cam segment until a stable position is reached. Then the first cam segment is withdrawn adequately to enable the cam follower to engage a second cam which controls reversal of the carrier back to a different stable position, from which the carrier can again be advanced.

By selective use of opposed thrust in accordance with the invention, an optimum velocity profile may be provided for the work carrier device. If more accurate indexing is desired, a position servo system can be utilized. Auxiliary damping is typically incorporated in the system to minimize velocity fluctuations and oscillations in the system.

BRIEF DESCRIPTION OF THE DRAWINGS

A better understanding of the invention may be had by reference to the following description, taken in conjunction with the accompanying drawings, in which:

FIG. 2 is a side view of an example of a conveyor system in accordance with the invention;

FIG. 3 is a top view of the example of FIG. 2;

DETAILED DESCRIPTION OF THE INVENTION

Figure 1:
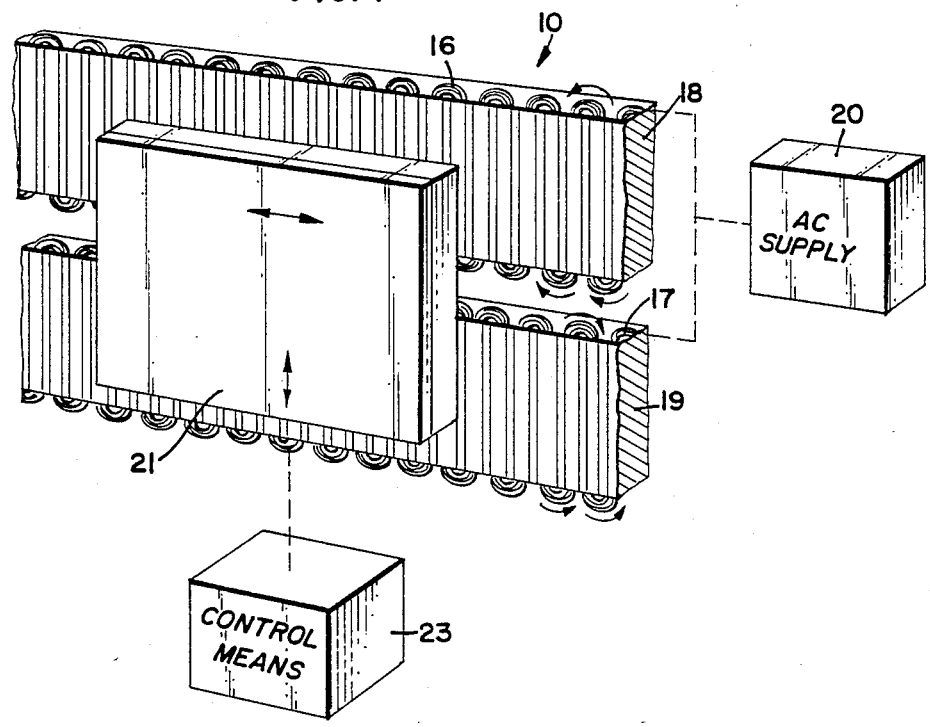
FIG. 1 is a perspective view, partially broken away, of a bidirectional linear induction motor in accordance with the invention.
Figure 4:
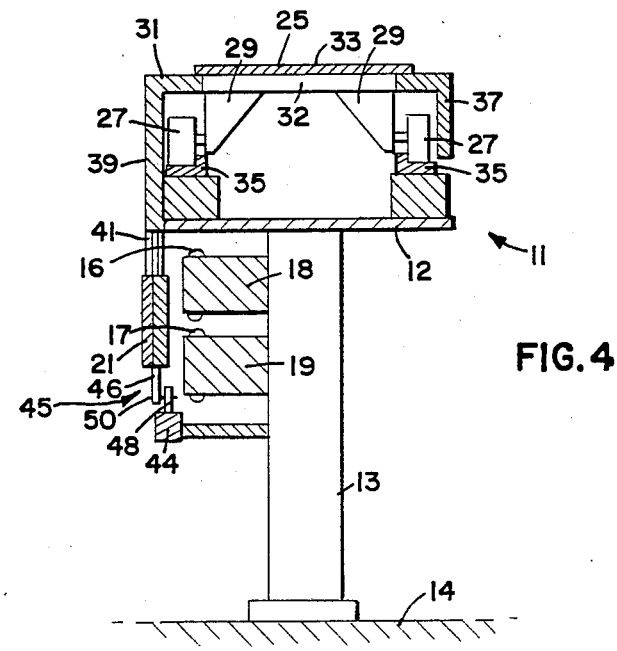
FIG. 4 is an end sectional view of the example of FIG. 2 taken along the line 4—4 in FIG. 2 and looking in the direction of the appended arrows.

FIG. 1 depicts certain essential elements of an exemplary linear induction motor 10 in accordance with the invention while FIGS. 2-4 are different views of a portion of an automated conveyor system 11 of which the linear induction motor 10 constitutes an integral part. It will be appreciated that the LIM 10 has many other applications as well, because the system can be used wherever precise thrust and velocity control are desired. However the conveyor system application is a particularly useful one because of the conflicting demands imposed by such systems.

In general, as seen particularly in FIGS. 2-4, the conveyor system 11 has a rail, or track, bed 12 suitably supported, as by a plurality of spaced apart pillars 13, or equivalent structural means, above the level of a floor 14. The rail bed 12 follows a predetermined path for transferring workpiece between work stations. Below and at one side of the rail bed 12 two oppositely wound primary windings 16, 17 (best seen in FIG. 1) forming part of the LIM 10 are suitably attached to the support pillars 13 in vertically spaced parallel relation along the conveyor path. The primary windings 16, 17 lie in slotted magnetic core structures 18, 19 respectively and define bands or strips which also lie along the predetermined path for the items to be conveyed. At each point along the path the operative surfaces of the primary windings 16, 17 are flush with the same vertical plane along which they are spaced. Electrical supply means 20 are connected to energize the two primary windings 16, 17 with AC signal energy which is, in this example, of constant amplitude. The MMF waves transferred along the primary windings 16, 17 react with the fields induced in a parallel but spaced apart secondary winding 21 which is translatable in orthogonal directions relative to the central axis between the two primary windings 16, 17. Although this cental axis is shown as horizontal in this system, it could be in virtually any attitude. Driving force moves the secondary winding 21 along the horizontal direction while control force is employed to shift it orthogonally (i.e. vertically in FIG. 1). The secondary control means 23 is depicted only generally in FIG. 1.

Referring now to FIGS. 2 to 4 specifically, a carrier or cart 25 on which the secondary winding 21 is movably mounted is supported at each corner by wheels 27 suitably journaled for rotation in blocks 29 extended beneath a work surface 31 at the top of the cart 25. The work surface 31 has a central rectangular opening 32 about which a workpiece 33 is supported (as seen only in FIG. 4). A number of like carts 25 are to be moved along the conveyor path concurrently but in sequence, with velocity variations between work stations that follow a predetermined pattern. The workpiece 33, which may for example be a printed circuit board (not shown in detail) is supported above the rectangular opening 32 so that access can be had to both sides of the workpiece 33 as it is being processed.

The forward and rear wheels 27 of the cart 25 are spaced apart to engage similarly spaced rails 35, or horizontally separated guide tracks, disposed along the conveyor path on the rail bed 12, as best shown in FIGS. 3 and 4. Grooves in the rails 35 maintain the cart 25 along the path despite the application of forces that tend to pivot it. The side of the cart 25 parallel to the conveyor path but opposite the primary windings 16, 17 includes a balancing downward extension 37 adjacent the rail bed 12. The opposite side of the cart 25, close to the primary windings 16, 17 has an extension 39 of greater length projecting downward outside the rail bed 12. The longer extension 39 includes a pair of of spaced apart vertical slide races 41, 42 between which the conductive secondary winding 21 is installed for upward and downward movement in close but spaced apart parallel relation with respect to the two primary windings 16, 17. Thus a minimum reluctance path is provided for the required inductive coupling between the secondary winding 21 and the two primary windings 16, 17 to form in combination a linear induction motor as depicted generally in FIG. 1. The length of the races 41, 42 permits vertical movement of the secondary winding 21 between limit positions, which determine maximum net thrust. At one extreme there can be inductive coupling with only the upper primary winding 16, while at the other extreme there can be inductive coupling with only the lower primary winding 17, but the displacements need not extend this far nor need they be symmetrical. This usage of horizontal actuation and vertical control adjustment is optional, inasmuch as it will be apparent that the elements can be in any orientation where suitable provision is made for guiding the carts.

For automatic and accurate control of the speed of the cart 25 a suitably contoured elongated cam 44 is mounted on the pillars 13 below the lower primary winding 17 to extend generally horizontally along the conveyor path. The cam 44 path generally conforms to the conveyor path, but is of varying relative height to predetermine forward and reverse movements at different speeds, and stationary positions as well. A cam follower 45 in engagement with the cam 44 includes an arm 46 that is attached at one end to the secondary 21, the follower 45 being urged against the cam 44 by springs 47. A rotatable wheel 48 on a shaft 50 adjacent the end of the arm 46 maintains contact with the cam 44 as the cart 25 moves, shifting the vertical position of the secondary winding 21 accordingly.

As the cart 25 proceeds along the conveyor path the net thrust generated by the two opposing primary windings 16, 17 at any particular point is determined by the vertical position of the secondary winding 21 with respect to the two vertically spaced primary windings 16, 17 which it overlaps in whole or in part. When the secondary winding 21 is centered between the primary windings 16, 17 the areas juxtaposed opposite the two primary windings 16, 17 are equal and the horizontal thrusts cancel, so that the cart 25 is not being impelled in either direction. Where, as seen in FIG. 2, the cam 44 is at an angle crossing the center position, a stable, non-creep, position is defined because movement off the balance point introduces a compensating thrust to return to the balance point. The instantaneous position of the secondary winding 21 is predetermined by the cam 44 and cam follower 45 combination to properly establish variations in thrust which in turn define the velocity profile of the cart 25 as it advances along the conveyor path of the system 11. Thus the velocity profile, seen in FIG. 6, reflects the cumulative effect of net thrust, instantaneous velocity, and drag on the cart. At work station locations the cart 25 is typically fully stopped at dwell positions when the secondary 21 is inductively coupled equally with each of the two primary windings 16, 17.

Each work station may include a timed mechanism (not shown) such as an actuator device 51 to move the cart forward off the dwell position to a downstream location where the cam 44 and cam follower 45 combination again offsets the secondary winding 21 relative to the balanced position so that net forward thrust is exerted. This independent advancing action is undertaken at the work station after completion of the desired task, so that the progression between work stations is automatic. A technician who is present at a work station may simply push the cart 25 away from the work station so that forward advance may continue, but fully automatic operation such as is achieved with the actuator device 51 is usually preferred. Alternatively an actuator may move the cam to a forward drive position.

Use of a single primary winding in a portion of this LIM driven conveyor system is satisfactory at intermediate regions where only sustained unidirectional motion is required, as seen in FIG. 2. Where only a constant, or near constant, velocity is required for a substantial distance, as between well-spaced work stations, therefore, the conveyor station is simplified. As shown in FIG. 2, the upper one of the primary windings 16 may terminate at position 52 and the cam 44 shaped thereafter to position the secondary winding 21 in full inductive coupling relation with the lower primary winding 17, so that maximum velocity is generated until the cart 25 is to be decelerated.

Opposing thrust velocity controlled LIMs in accordance with the invention not only provide velocity control and stable stationary operation but have a number of other operative advantages as well. Energizing signal variations and inductive decoupling affect both coupling regions equally, and the net thrust for a given secondary winding 21 position is therefore reliably determined. The variation in control position requires relatively little force and the normal forces exerted vary with position but are easily reacted against by mechanical guide elements.

In a conveyor system a plurality of carts 25 can be used in sequence, each moving in predetermined fashion between work stations. The operative distance between carts 25 is established for minimum likelihood that a following cart will catch up and collide with a preceding cart. However, even with such precaution, each of the carts 25 is further provided with a rearward extending and tapered probe 54 riding along one side of rail 35, as shown in FIG. 3. Each cart 25 also includes a forward extending wedge surface 55 in line with the probe 54, the wedge surface being an extension of the secondary winding 21 and movable with it. When a following cart 25 contacts the probe 54 of the preceding cart, the probe 54 raises the wedge surface 55 and coupled secondary winding 21 to the center line position, creating a stable dwell situation. This allows the prior cart in the sequence to complete its allotted task or movement. Subsequent movement of the forward cart 25 releases the secondary winding 21 to return to its cam-controlled position so that the stopped cart can then resume motion.

The cart 25 with its secondary winding 21 has been set forth above to have a specific geometrical relation with respect to vertically separated primary windings 16, 17 as mounted on the supporting pillar 13 structure. Other equally operable format and structural support arrangements can be devised, with for example horizontally separated primary windings 16, 17 and a side accessible workpiece on a cart.

The arrangement of FIGS. 2-4 is not bidirectional, inasmuch as the cart seeks to position itself at locations where the net thrust is zero and will return to any such point if reverse thrust predominates. If desired to move a workpiece bidirectionally, as by shuttling it for a time between work stations, the modification of FIG. 5 is useful.

Figure 5:
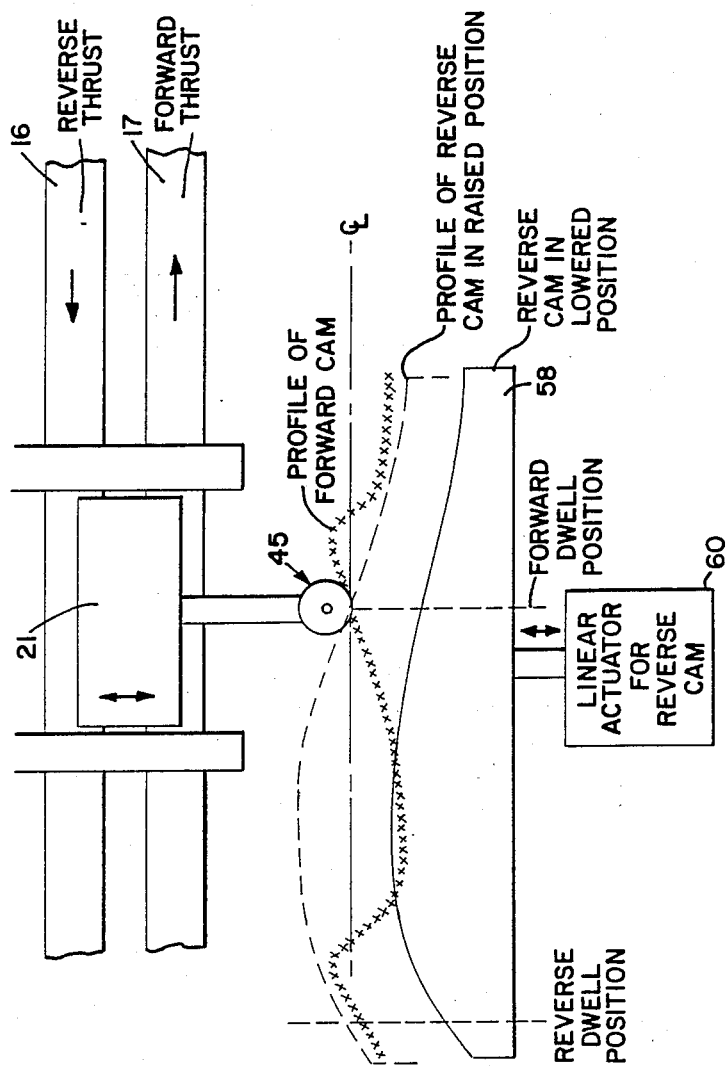
FIG. 5 is a simplified block representation of a modification of the system of FIGS. 2-4 in which the carrier is shuttled bidirectionally between positions.

In FIG. 5, a length of the cam mechanism extending between work stations, labeled forward dwell position and reverse dwell position, respectively is shown in relation to the cam follower 45, the secondary winding 21, and the primary windings 16 and 17, shown only in simplified form. The cam mechanism includes two parallel and adjacent cam segments while the cam follower 45 is wide enough to span both segments. One segment labeled profile of forward cam, is fixed and has a profile which advances the secondary winding 21 (and associated cart) until it reaches a stable position at work station I. The other cam segment 58, may be called the reverse thrust segment and is normally below the level of the forward thrust cam segment, being movable upwardly to a higher level by an actuator 60, energized as by a signal from a sequence controller at the forward dwell position that signals when a task has been completed. Consequently, to shuttle the secondary 21 and associated cart and workpiece between the forward dwell position and the reverse dwell position, forward thrust predominates, and the profile of the forward cam segment 57 controls until the forward dwell position is reached. Then the reverse thrust segment 58 is raised into position and reverse thrust predominates until the reverse dwell position is reached. It is evident that other cam segments may be similarly controlled for bidirectional movement, and that the cam follower can be designed to shift between two or more separate but adjacent cams.

Figure 6:
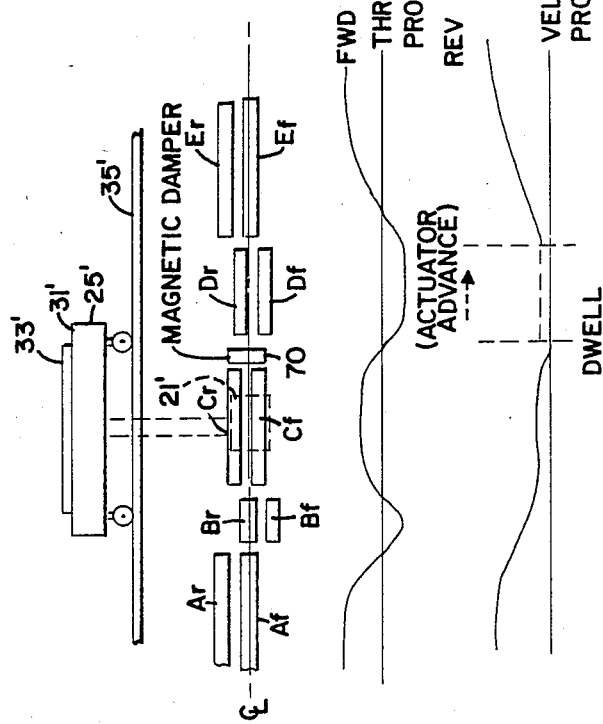
FIG. 6 is a simplified block diagram and perspective representation of a further example of a system in accordance with the invention.

A further operable format having fewer elements is shown in simplified form in FIG. 6, illustrating a modification of the LIM that does not use cam control. In the example of FIG. 6 the secondary 21' is mounted in fixed relation to the work surface 31' of the cart 25'. No cam or cam follower is required, but instead the two primary windings, while still disposed in generally parallel relation along the conveyor path, are variably separated by selected vertical displacements from a center line of the path. For ease of fabrication the primary winding are formed as straight length segments disposed end to end but at given vertical positions or separations which determine the instantaneous net thrust at each point and, taken together, the velocity profile. Because the cart and secondary mechanism can be simplified, this variation of the opposed thrust approach is particulaarly useful where long distances are to be covered, inasmuch as standard primary sections can be used. Also only one primary need be used where maximum velocity can be attained for a given distance.

However, control of deceleration and index positioning typically is best achieved using variations in lengths of the segments (designated $A_f \ldots E_f$ for forward thrust and $A_r \ldots E_r$ for reverse thrust). It is also useful to employ a magnetic damping element 70 in series with the primaries 16', 17' at dwell positions. As seen in FIG. 6, the primary sections $A_f$ and $A_r$ are disposed to exert maximum thrust until the work station is approached, at which region a short reverse thrust region is interposed by sections $B_f$ and $B_r$, which are not of sufficient length relative to the secondary 21' to create a danger of stopping. The secondary 21' then passes a section $C_f$ and $C_r$ generating moderate forward thrust until it reaches a reverse thrust segment $D_f$ and $D_r$, where it seeks a dwell position in which the net forward thrust of the trailing segments $C_f$ and $C_r$ is precisely compensated by the net reverse thrust from $D_f$ and $D_r$. The presence of the magnetic element 70 introduces drag which damps any oscillation tendency. The cart 25' positioned at the stable dwell point can them be moved off, when the task is completed, to another net forward thrust section $E_f$ and $E_r$, for advance toward the next work station.

As will be recognized, the positions and lengths of the primary pairs can be varied to change the velocity profile. Also, the segments can be curved or of unlike thrust in each pair to meet the needs of particular applications as to geometry and power. In using incremental primary segments in this way the controlling thrusts are more discontinuous, but the areas of interaction with the secondary provide an integrating effect that reduces the sharpness of the discontinuity. Here it can also be seen that control of the velocity profile is a function of the size, particularly the length, of the secondary relative to the length of the primaries in deceleration and dwell zones.

Figure 7:
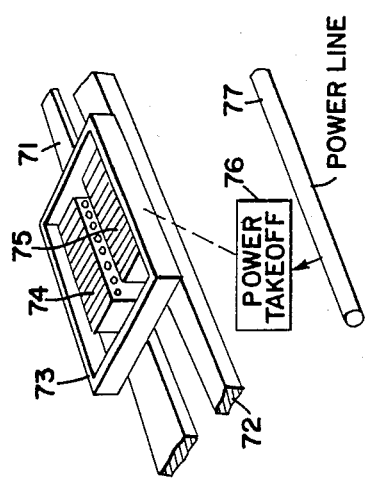
FIG. 7 is a perspective view, partially broken away, of a system in accordance with the invention in which the primaries are mounted on the carrier.

The opposing thrust principle can be utilized in comparable fashion, as shown in FIG. 7, with side-by-side primaries 71, 72 on a cart 73; and variably placed secondaries 74, 75 disposed along the predetermined path for the cart 73. Energization of the primaries 71, 72 is accomplished by a power take off 76 (e.g. brushes or an inductive pickup) in circuit with a hot line 77 from a source 78, the line 77 being parallel to the cart 73 path. The primaries 71, 72 are energized to generate traveling MMF waves in opposite senses, and each is inductively coupled to a different secondary 74 or 75 respectively. The primaries 71, 72 are of equal energy level, but here the secondary areas are varied along their lengths to change the net thrust exerted at instantaneous positions, and consequently the velocity profile. The lateral spacings or gap could be varied to like effect. This arrangement is particularly useful where power is made available to the cart for other reasons. In any event, the advantages of the opposed thrust approach in providing both high velocity and precise control are fully realized.

Although a number of forms and variations in accordance with the invention have been disclosed it will be appreciated that the invention is not limited thereto but encompasses all modifications and expedients falling within the scope of the appended claims.

What is claimed is:

1. In a linear induction motor, a system for controlling relative movement and velocity between a fixed element and a movable element caused by an interaction between a moving magnetic field and a field resulting from currents induced in a conductive member, the system comprising:
  (a) a first movable areal member having an area sufficient to span at least a first region and a second region;
  (b) first and second stationary areal members disposed along and adjacent to the movement direction of the first movable areal member, the first stationary areal member occupying the first region and the second stationary areal member occupying the second region;
  (c) electromagnetic force means coupled to at least one of said stationary areal members for concurrently generating opposed thrust on the movable member in the first region and the second region, the thrust produced in the first region tending to translate the first movable areal member in a first direction, the thrust produced in the second region tending to translate the first movable areal member in a second direction, and;
  (d) a secondary winding, the secondary winding being cooperatively connected to the first movable areal member, the secondary winding being variably positionable with respect to the first region and the second region, thereby permitting variation in the relative movement and velocity between the first movable area member and the first and second stationary areal members.

2. In a linear induction motor, in which relative movement between a fixed element and a movable element is caused by an interaction between a moving magnetic field and a field resulting from currents induced in a conductive member, the combination comprising:
  (a) a first movable areal member, the first movable areal member having a secondary winding having an area sufficient to span at least two different regions, the first movable area member being capable of movement in at least two movement directions;

(b) second and third stationary areal members disposed along and adjacent to the movement direction of the first areal member and occupying each of the two different regions, respectively (c) magnetic force generating means coupled to at least one of said second and third stationary areal members for concurrently imparting opposed thrust to the first movable areal member in the two different regions, whereby the relative areas of the second and third stationary areal members relative to the secondary winding of the first movable areal member at any position determine the net thrust exerted on the first movable member along the movement direction; and (d) positioning means, the positioning means being coupled to the secondary winding of the first movable area member, the positioning means being capable of altering interaction between the secondary winding and each of the two different regions, thereby altering motion of the first movable areal member along the movement direction by changing the coupling relationships between the secondary winding of the first member and the second stationary areal member and the third stationary areal.

3. The invention as set forth in claim 1 above, wherein the opposing thrusts are generated concurrently.

4. The invention as set forth in claim 3 above, wherein the first movable areal member is mounted on a rail, the secondary winding being disposed relative to the rail so as to be capable of selectively intercepting desired portions of the electromagnetic force means in either the first region or the second region.

5. The invention as set forth in claim 4 above, wherein the first stationary areal member and the first region are disposed in a substantially parallel relationship to the rail, the second stationary areal member and the second region are also disposed in a substantially parallel relationship to the rail such that translation of the secondary winding parallel to the rail preserves its relative position with respect to the first stationary areal member and the second stationary areal member.

6. The invention as set forth in claim 5 above, wherein the secondary winding is capable of translational movement perpendicular to the rail, said perpendicular translational movement varying the position of the secondary winding relative to the first region and the second region, thereby altering the tendency of the first movable areal member to travel in either the first direction or the second direction.

7. The invention as set forth in claim 6 above, wherein the perpendicular translation of the secondary winding permits the secondary winding to occupy a position relative to the first region and the second region such that the first movable areal member is stationary.

8. The invention as set forth in claim 7 above, wherein the the secondary winding is mechanically coupled to a movement resisting element, said movement resisting element tending to preserve the stationary position of the first movable area member.

* * * * *